United States Patent [19]
May

[11] Patent Number: 5,522,409
[45] Date of Patent: Jun. 4, 1996

[54] COLLAPSIBLE VEHICLE COVER

[76] Inventor: Margaret E. May, Rte. 4, Box 4240, Monticello, Fla. 32344

[21] Appl. No.: 335,051

[22] Filed: Nov. 7, 1994

[51] Int. Cl.⁶ .................................. B60J 7/20; A45F 1/14
[52] U.S. Cl. .................... 135/88.05; 135/88.01; 135/88.08; 135/126; 135/132; 135/133
[58] Field of Search .................... 135/95, 88.01, 135/88.13, 88.05, 88.08, 126, 132, 133, 134, 135, 138, 147, 153, 115, 119, 907

[56] References Cited

U.S. PATENT DOCUMENTS

| | | | |
|---|---|---|---|
| 2,571,362 | 10/1951 | Hervey . | |
| 2,598,940 | 6/1952 | Robie | 135/133 |
| 2,798,501 | 7/1957 | Oliver . | |
| 4,088,363 | 5/1978 | Palmer | 135/133 X |
| 4,164,233 | 8/1979 | McAndrew | 135/88.08 |
| 4,184,501 | 1/1980 | Johnson | 135/88.08 |
| 4,432,581 | 2/1984 | Guma | 135/88.08 X |
| 4,683,900 | 8/1987 | Carmichael | 135/88.01 |
| 4,684,165 | 8/1987 | Becker | 135/88.08 X |
| 4,886,083 | 12/1989 | Gamache . | |
| 4,925,234 | 5/1990 | Park et al. | 135/119 X |
| 4,944,321 | 7/1990 | Moyet-Ortiz . | |

FOREIGN PATENT DOCUMENTS

1278974  11/1961  France ................................. 135/132

Primary Examiner—Wynn E. Wood
Attorney, Agent, or Firm—Carnes, Cona, Dixon

[57] ABSTRACT

The present invention provides for a vehicle cover apparatus that includes a front housing that is secured to the front bumper of a vehicle and a back housing that is secured to the rear bumper of a vehicle. The front housing stores the front portion of the vehicle cover apparatus while the back housing stores the back portion of the vehicle cover apparatus. The front portion includes a first collapsible canopy-like frame that is affixed, by clamping devices, onto the front area of a vehicle. A first fabric cover is attached to the first frame. The back portion includes a second collapsible canopy-like frame that is affixed, by clamping devices, onto the back area of a vehicle. A second fabric cover is attached to the second frame. Once the first and second frames are removed from its respective housing, the front portion meets with the back portion are secured in place by an attachment device, such as buttons or hook and loop material. This will provide fro the vehicle to be protected from heat, sun, or snow.

20 Claims, 10 Drawing Sheets

COLLAPSIBLE VEHICLE COVER

BACKGROUND OF THE INVENTION

1. Field of the Invention

The present invention relates generally to a vehicle cover and more particularly to a vehicle cover apparatus that is stored and secured to the front and rear bumper when the device is not in use and when utilized is pulled out in a canopy fashion to cover and protect the vehicle from heat, sun damage, and snow.

2. Description of the Prior Art

It has long been recognized that there is a multiplicity of car covers that are used with various motor vehicles. These car covers offer protection for the vehicle when the car is not in use.

One such vehicle cover is disclosed in U.S. Pat. No. 2,571,362, issued to Hervey. Hervey discloses a foldable canopy frame car cover wherein the frame is centrally mounted on the side wall of the vehicle's body. The frame portions extends across the side wall of the vehicle. This arrangement and design provides for a vehicle cover that can only be used with certain cars. This car cover cannot be used with vehicles having no more than two doors nor can this vehicle cover be used with a car having a hatch back. The placement of this frame provides for it to extend across the back area of the side wall of the vehicle, thereby providing the frame to be in the way of the third and fourth door of a vehicle. Further when Hervey's frame is not in use and is collapsed, the frame elements are stacked on the rear bumper, thereby making it virtually impossible to have access to a hatch back. Hervey also includes side curtains to be attached to the vehicle cover. These side curtains not only increase the time it takes to cover the vehicle but also increases the cost of the cover. Hervey is also silent to the use of a housing for storing the collapse frame on the bumper of the vehicle.

U.S. Pat. No. 2,789,501 issued to Oliver discloses a collapsible housing structure which is used to house a vehicle. The structure disclosed by Oliver includes a pair of pads which receives the front wheel of a vehicle. The structure of Oliver is not attached to the vehicle and cannot fit inside the vehicle, thereby making it non-portable.

U.S. Pat. No. 4,886,083 issued to Gamache and U.S. Pat. No. 4,944,321 issued to Moyet-Ortiz both disclose a vehicle cover wherein the front wheels are driven onto a pair of front pads and the back wheels are driven onto a pair of back pads. A canopy frame is then used to cover and house the vehicle. Both Gamache and Moyet-Ortiz are silent to attaching the frame to the vehicle.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides for a vehicle cover apparatus who's housing is adapted to be removably secured to the front and rear bumper of a vehicle. Once in place, the canopy-like cover is removed and secured over the top of the car and affixed in place by an attachment means. The vehicle cover apparatus of the present invention consists of a front housing, a rear housing, a first cover for covering the front end of the vehicle, and a second cover for covering the back end of the vehicle.

The housing maintains the canopy or collapsible protective structure when the apparatus is not in use. To use, each housing is opened and the canopy is extended over the vehicle.

The canopy consists of a plurality of support bars which are hingedly secured to the side wall of the vehicle via a clamping device. The covering is secured to the support bars. The combination of the support bars and covering is design such that the vehicle cover apparatus does not touch nor contact the vehicle.

The support bars have an inverted U-shape wherein their ends are hingedly and pivotally attached to the clamping device. There is a total of four clamping devices to provide for the clamping devices to be located in the proximity of the wheels of the vehicle. Accordingly, the first two clamping devices are attached to the front of the vehicle to permit for the ends of a first set of support bars to be attached to the first two clamping devices. The next pair of clamping devices are attached to the back of the vehicle to permit for the ends of a second set of support bars to be attached to the second pair of clamping devices.

This arrangement will divide the device into the front portion and the back portion. This design will permit for the front portion to include the first set of support bars to be secured and stored in the first housing when the device is not in use while the back portion will include the second set of support bars to be secured and stored in the second housing when the device is not in use.

Accordingly, it is an object of the present invention to provide for a vehicle cover apparatus that will substantially reduce the temperature of a vehicle when exposed to the sun.

It is another object of the present invention to provide for a vehicle cover apparatus that will protect a car from snow or sun damage.

It is a further object of the present invention to provide for a vehicle cover apparatus that is adjustable and can be utilized with any type, style or model vehicle.

It is yet another object of the present invention to provide for a vehicle cover apparatus that is easy to use and durable in operation.

Still a further object of the present invention is to provide for a vehicle cover apparatus that does not contact the vehicle when in use.

A final object of the present invention, to be specifically enumerated herein, is to provide a vehicle cover apparatus in accordance with the proceeding objects and which will conform to conventional forms of manufacture, be of simple construction and easy to use so as to provide a device that would be economically feasible, long lasting and relatively trouble free in operation.

Although there have been many inventions related to a vehicle cover apparatus, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1A:
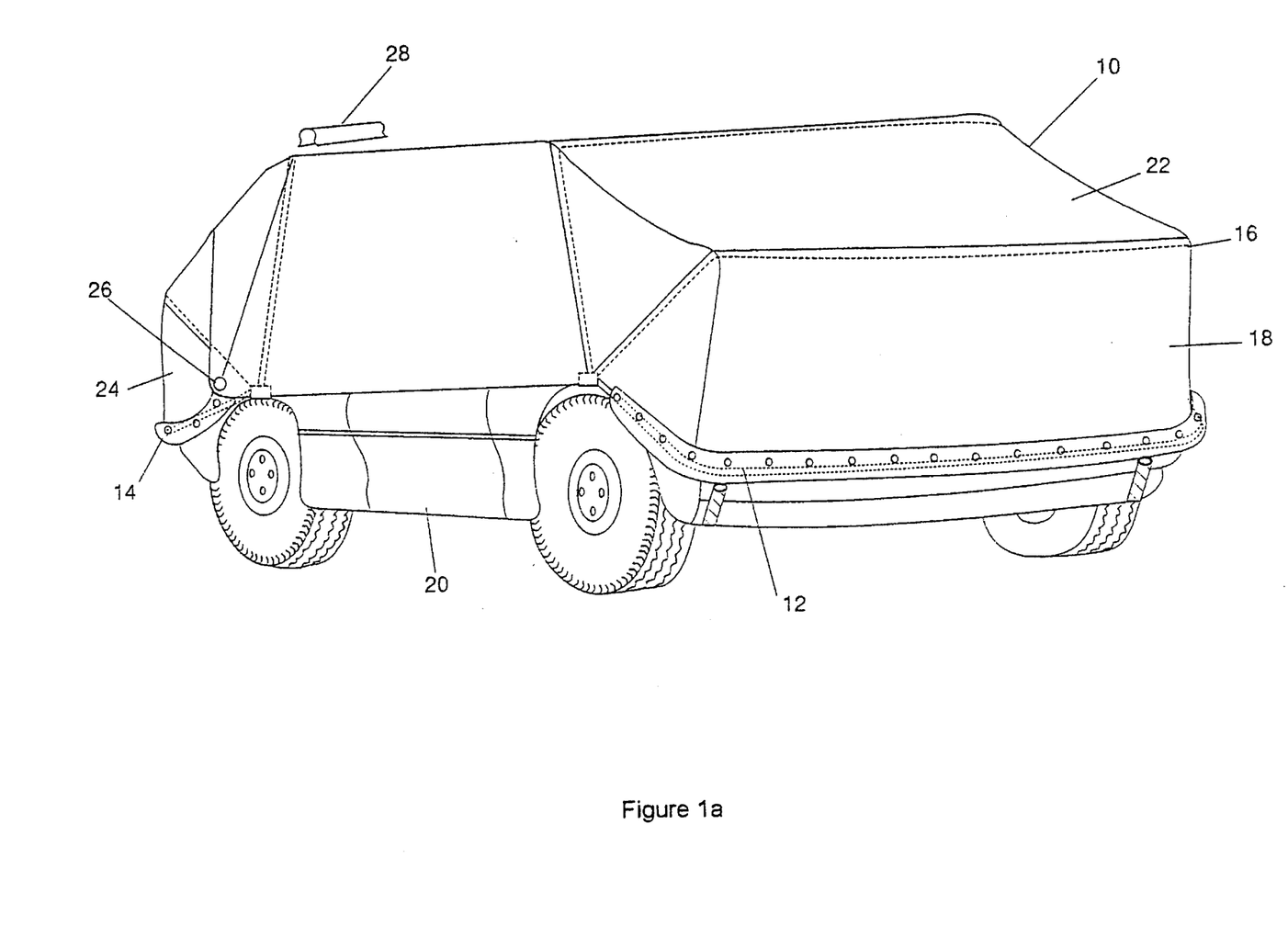
FIG. 1a is a perspective view of the vehicle cover apparatus that is extended over and covering a vehicle.

As illustrated in the drawings, FIG. 1a shows the perspective view of the vehicle cover apparatus 10 of the present invention. The vehicle cover apparatus 10 includes a first housing 12 that is affixed to the front bumper of a vehicle and a second housing 14 (partially illustrated) that is affixed to the back bumper of the vehicle 20. The housing 12 is illustrated in further detail in FIG. 2. The apparatus further includes a frame 16 (illustrated in outline) that supports and maintains a fabric cover 18. The frame is hingedly attached to the side walls of the vehicle 20.

It is noted that the fabric cover can be made from a variety of commercially available material. It is preferred that the material to be used for the cover be durable, breathable, as well as offering protection from the sun (having a sun protection factor of at least 15).

The vehicle cover apparatus 10 includes a front end 22 and a back end 24. When the vehicle cover is not in use then the front end is stored in the first housing and the back end is stored in the second housing. During utilization of the vehicle cover apparatus 10, the front end 22 is attached to the back end 24 by a securing means Various embodiments for the securing means 26 can be utilized for the vehicle cover apparatus. These embodiments can include, but not be limited to buttons and button holes (illustrated in FIG. 1a), a zipper, snaps, and fabric hook and loop material.

In addition to the securing means 26, a clip 28 can optionally be utilized to secured the front end of the device to the back end of the device.

Figure 1B:
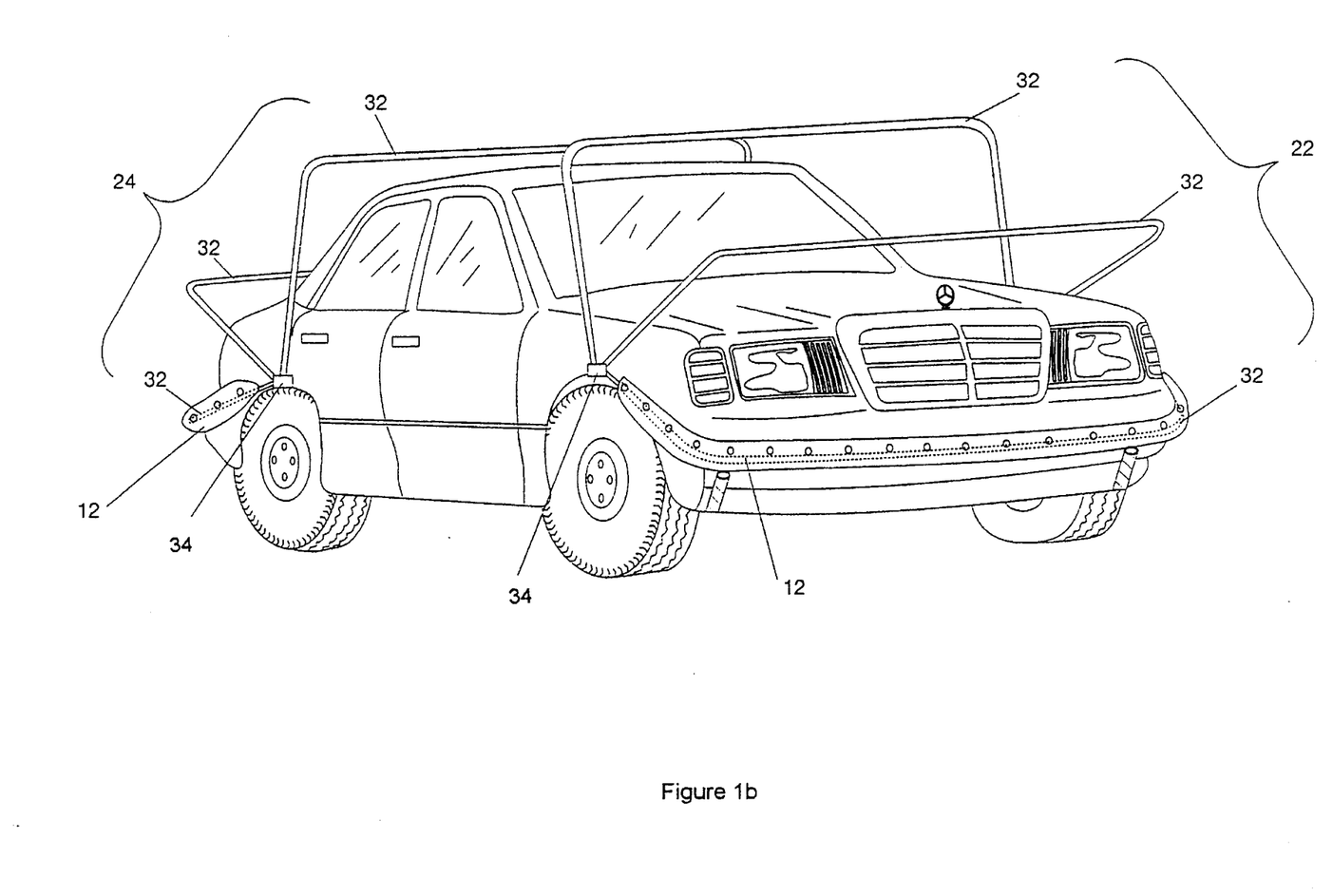
FIG. 1b is a perspective view of the frame of the vehicle cover apparatus that is extended over a vehicle.

The frame 16, illustrated in FIG. 1b, of the front end 22 and the back end 24 of the vehicle cover device each consists of a plurality of supporting bar members 32. Each supporting bar member is an inverted U-shape and includes a first end and a second end. Each first end and each second end is attached to a hinged member 34. Each hinged member is secured on the side wall of a vehicle in the proximity of the wheels. The hinged members 34 are discussed in further detail in FIGS. 3a and 3b. The under side of the covering (portion facing vehicle) includes loops made of the covering material. These loops includes openings or channels that receive the supporting bar members 32. An example of a loop that receives the supporting bar member is illustrated in further detail in FIG. 2.

Figure 2:
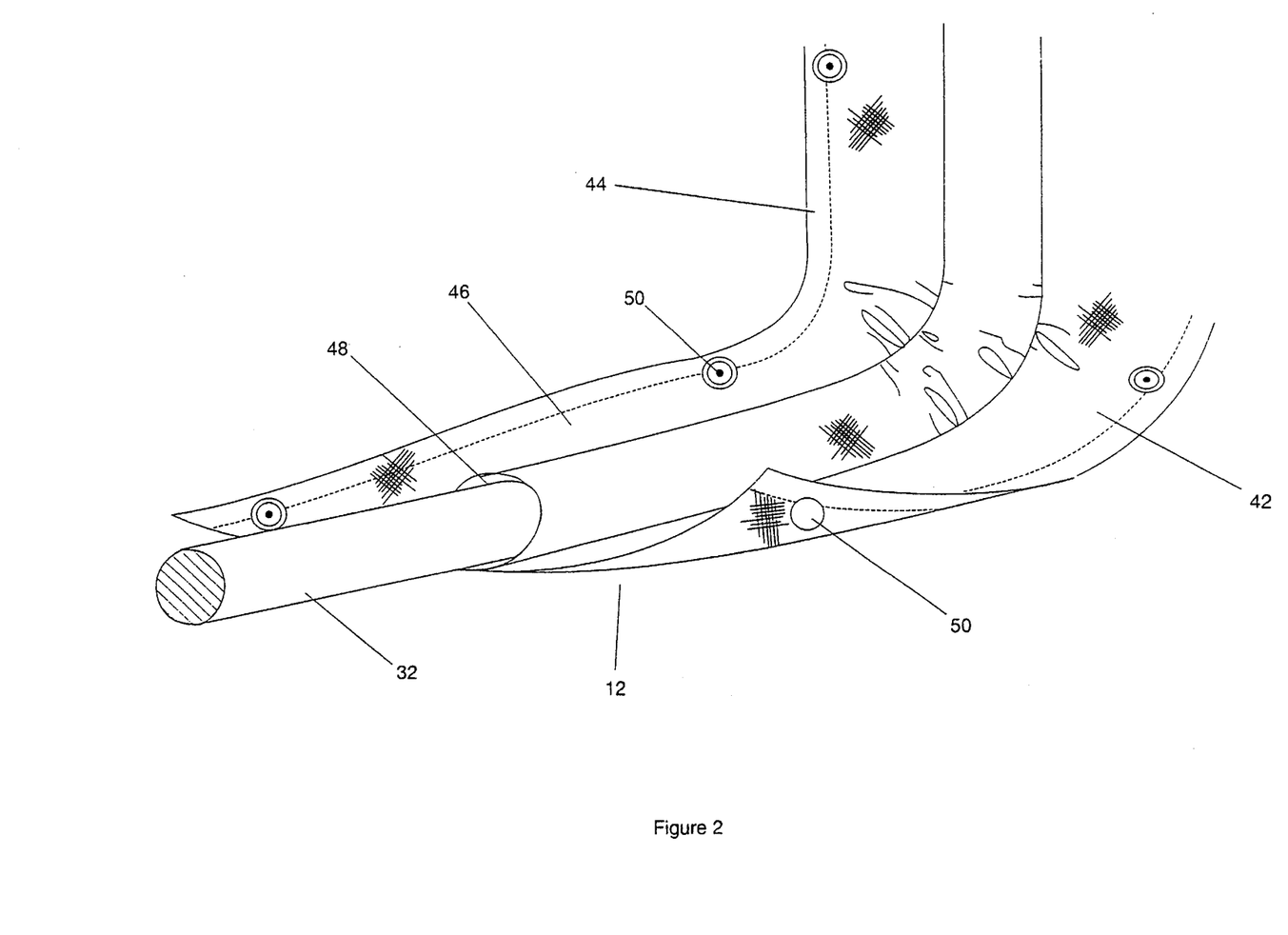
FIG. 2 is a perspective view of the housing used for the vehicle cover in the present invention.

The housing 12 is illustrated in further detail in FIG. 2. It is noted that in this figure only the housing used on the front bumper is illustrated and that the housing used on the back bumper is not separately illustrated in detail in that it is identical in design to the front portion. As seen in the figure, the housing also includes a first end 42, a second end 44, a top portion 46, and a bottom portion (not labeled). The bottom portion of the housing is located on the bumper and can optionally be attached to the bumper by an attachment means (not illustrated). This attachment means can provide for this housing to be permanently attached or adapted to be removably secured to the bumper. Accordingly, the attachment means can include, but not limited to, bolts, screws, adhesives, snaps, hook and loop material, strap-like material that wraps around the bumper (illustrated in FIG. 1b), etc. Centrally located within the top portion 46 and between the first and second ends (42, 44) is a loop of material that includes an opening 48. This opening extends linearly within the housing and is used for receiving, maintaining and supporting a supporting bar member 32. Located on the exposed edge of the first portion and second portion is a closure means 50. The first end 42 and the second end 44 wrap around the collapsed supporting bars 32 (when the device is not in use). The closure means 50 on the exposed edge of the first portion 42 and the closure means 50 on the exposed edge of the second portion 44 contact each other to provide for the housing 12 to securely enclose and maintain the supporting bars 32 of the frame. The closure means can be any conventional closure means, such as, but not limited to, snaps (illustrated in this figure), buttons and button holes, zipper, or hook and loop material.

Figure 3A:
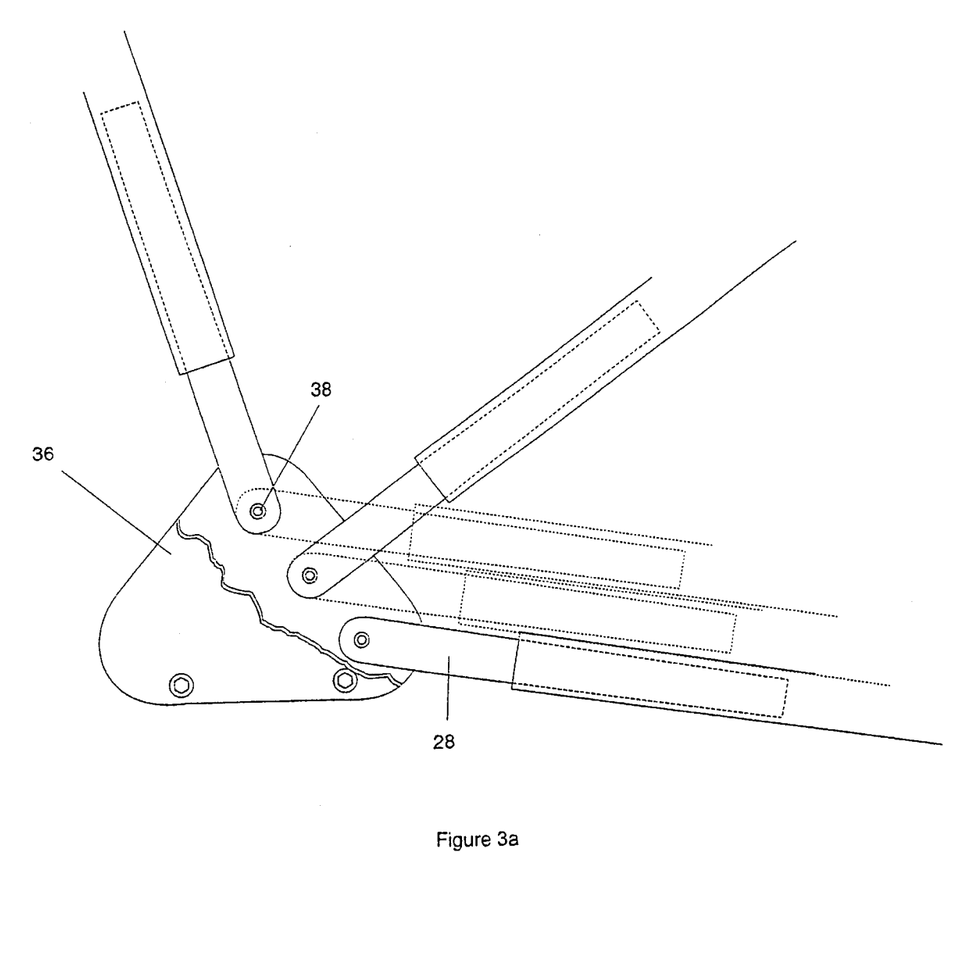
FIG. 3a is a side view of the first embodiment of the hinged portion of the support of the present invention.
Figure 3B:
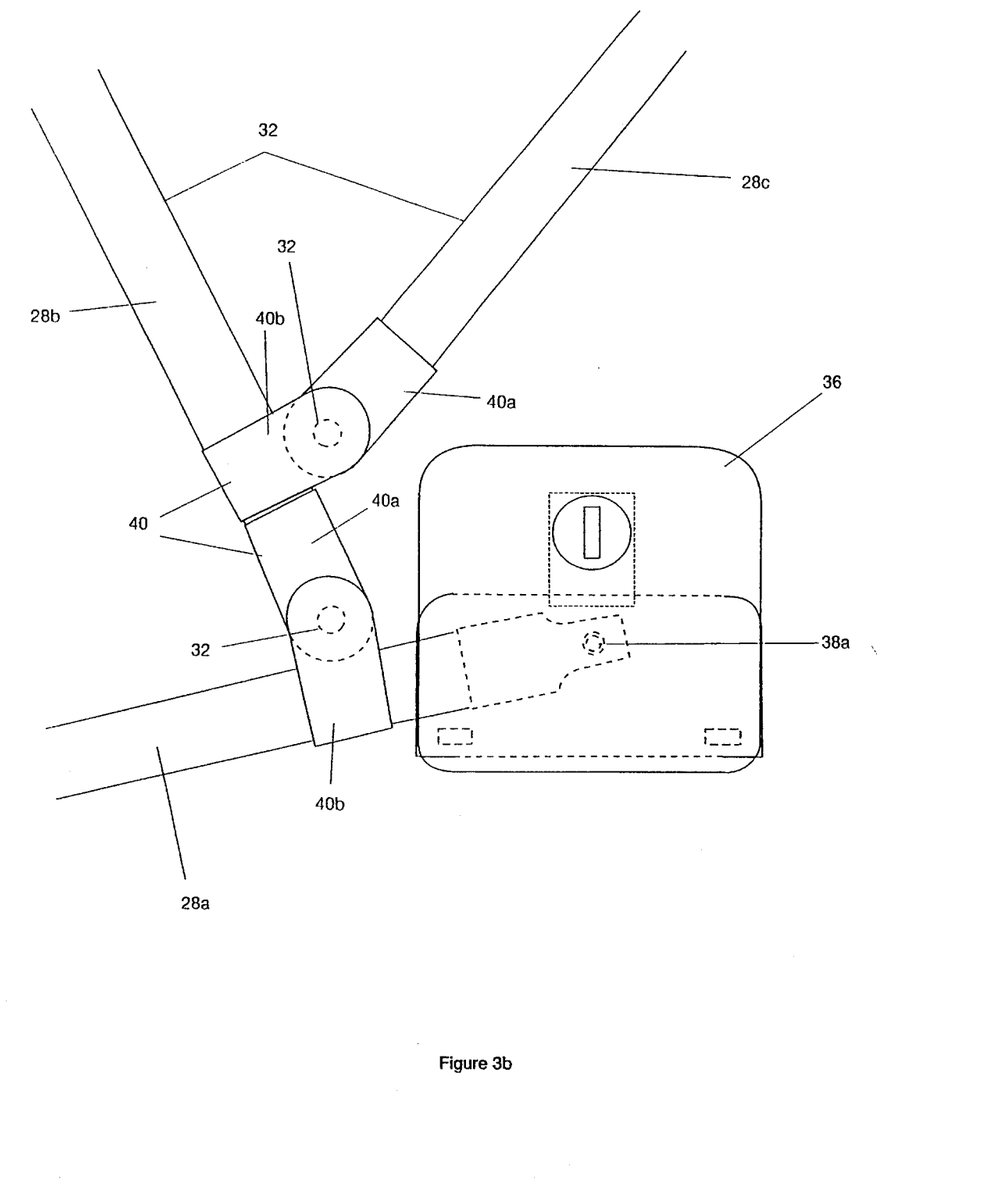
FIG. 3b is a side view of the second embodiment of the hinged portion of the support of the present invention.

The hinged members include two embodiments. The first embodiment is illustrated in FIG. 3a while the second embodiment is illustrated in FIG. 3b. It is noted that these figures illustrate the side view of the front portion of the support frame and that the back portion is not separately illustrated in detail in that it is identical in design to the front portion.

Figure 4A:
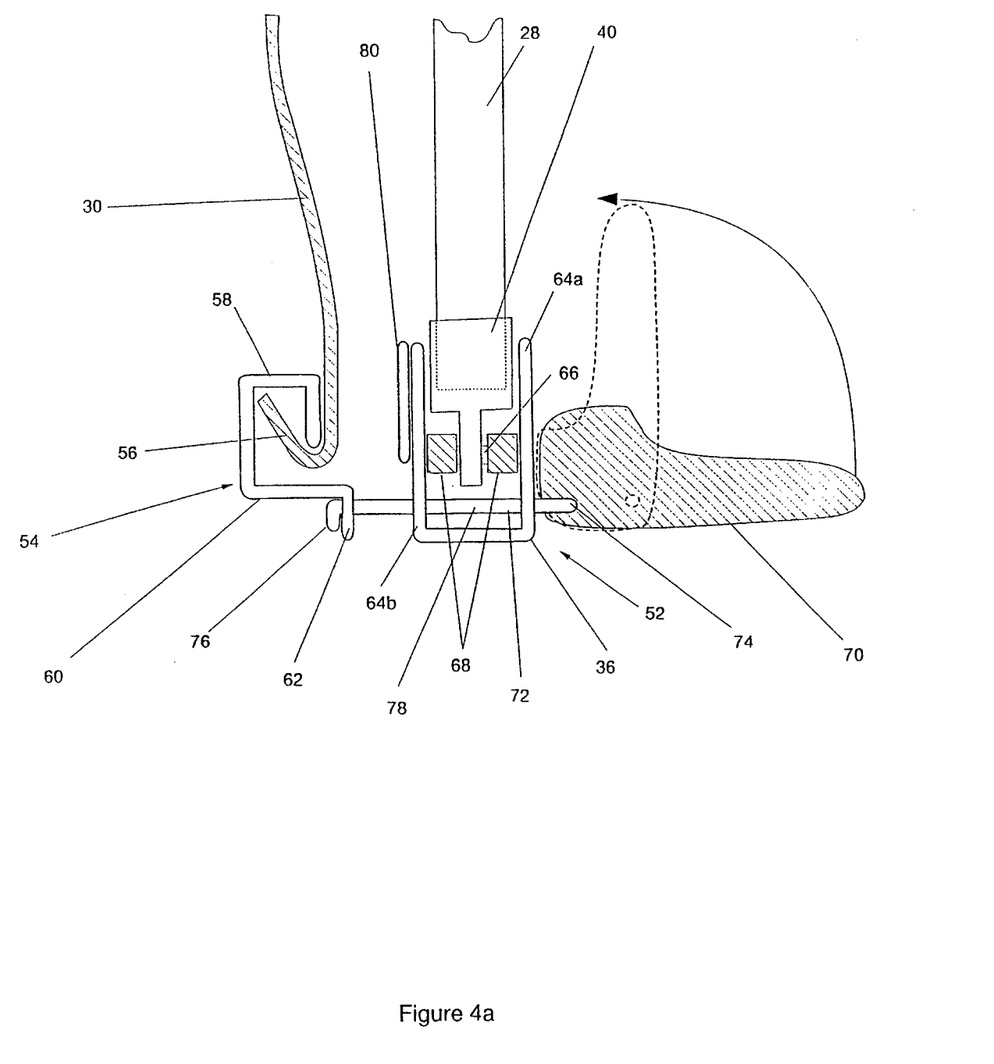
FIG. 4a is a side view of the clamp used in the present invention.
Figure 4B:
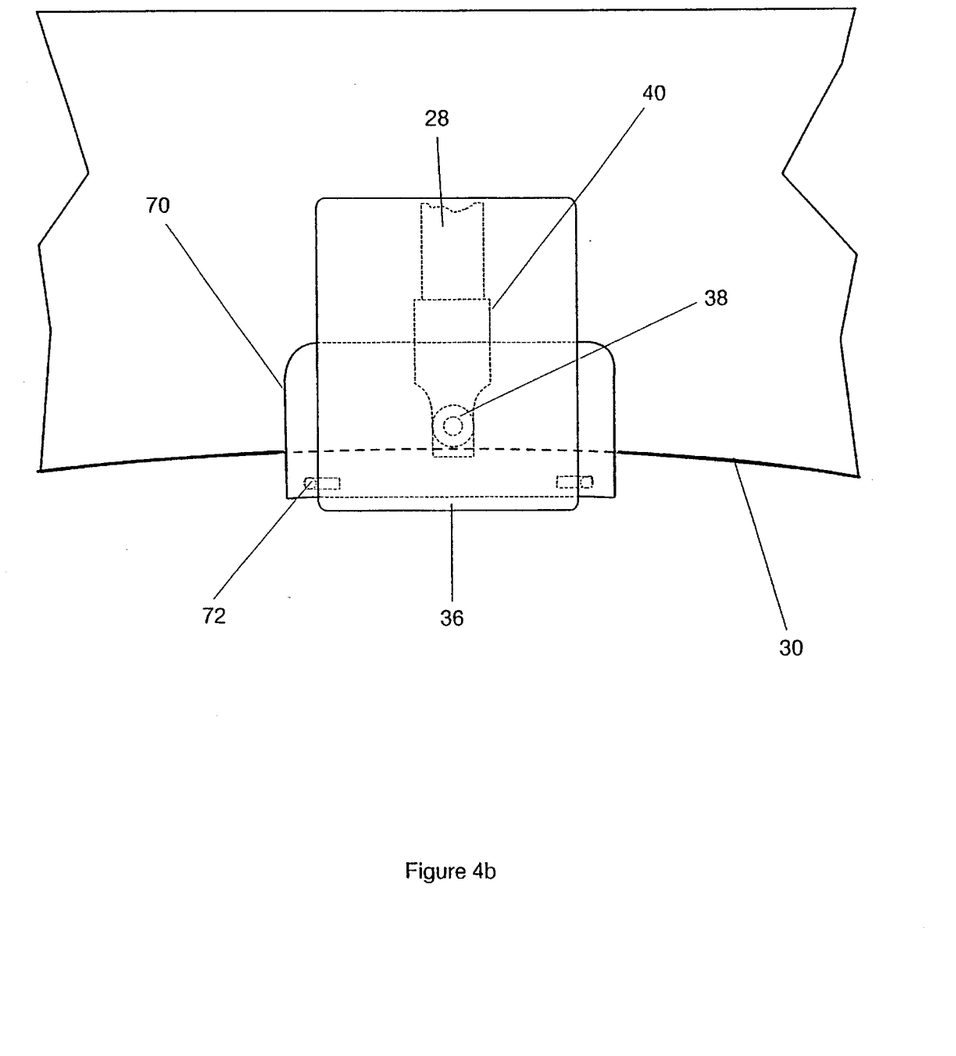
FIG. 4b is a front view of the clamp used in the present invention.
Figure 4C:
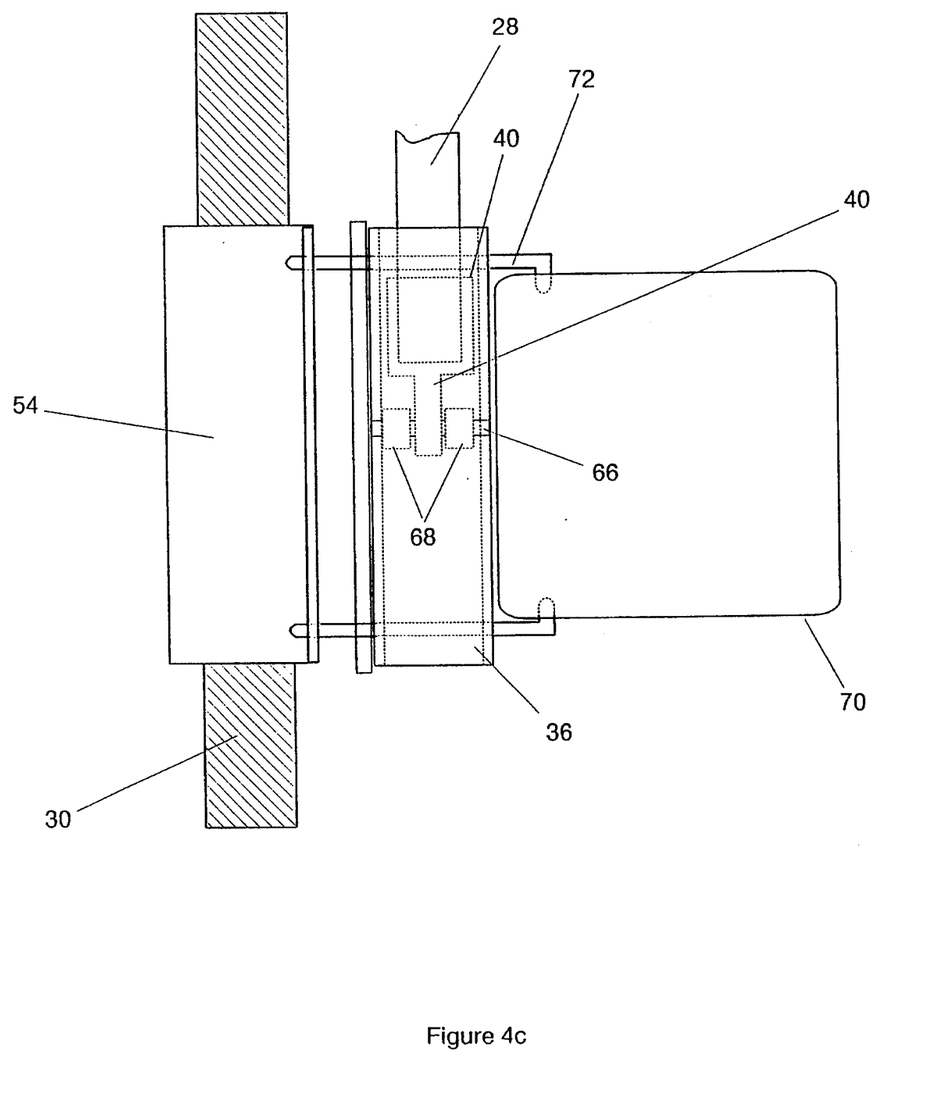
FIG. 4c is a bottom view of the clamp used in the present invention.
Figures 5A, 5B:
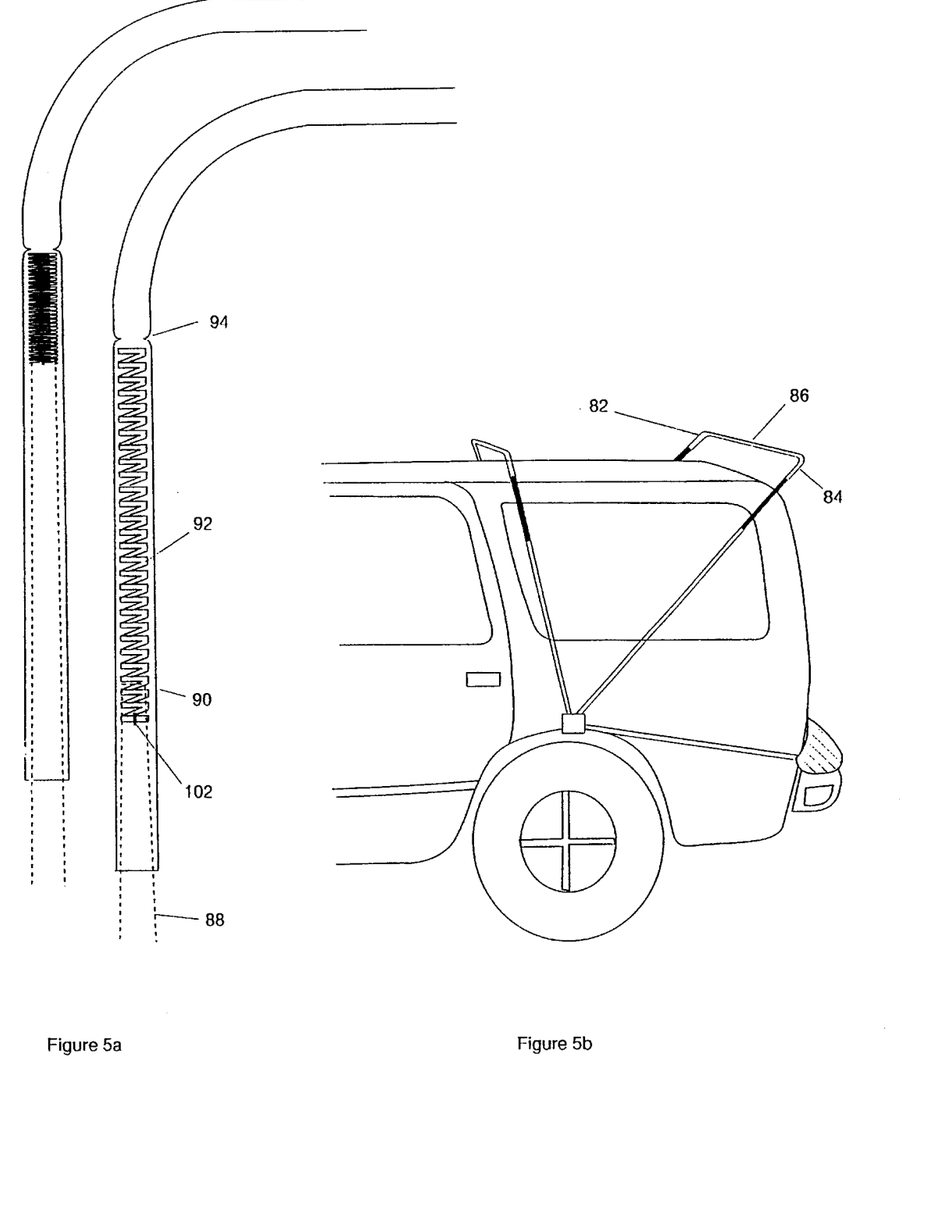
FIG. 5a is a cutaway view of the extension means for the supporting bars used in the vehicle cover apparatus of the present invention.
FIG. 5b is a partial side view of the frame using the supporting bars illustrated in FIG. 5a that is attached on the rear portion of a mini-van.

The first embodiment for the hinged portion is illustrated in FIG. 3a. As seen in this figure the hinged embodiment includes a support plate 36. The ends of the supporting bar members 28 are pivotally attached to the support plate 36 via a pivot union 38. The pivot unions are aligned angularly. The contact of the pivot union 38 with the support plate 36 provides for a contact point. The contact points are such that the previous contact point (lower) is at an acute angle with the subsequent contact point. When the device is not in use (not covering the vehicle) the supporting bars will communicate with one another, as is illustrated in outline. The pivot union 38 is discussed and illustrated in further detail in FIGS. 4a–4c. When the uppermost supporting bar member is lifted, then the succeeding members will inherently lift. The successive lifting of the support members is accomplished due to the fabric cover being secured to each support member. The support plate 36 is a portion of the clamp means. The clamp means is illustrated in further detail in FIGS. 4a–4c. This hinged arrangement is also illustrated in FIGS. 1a, 1b, and 5b.

The second embodiment of a the hinged member is illustrated in FIG. 3b. As illustrated, the hinged member of the second embodiment includes a support plate 36. An end of the first bar member (28a) is pivotally attached to the support plate by a pivot union 38a. An end of a second bar member (28b) is pivotally attached to the first bar member 28a by way of a swivel holster 40.

This swivel holster includes a first bar 40a and a second bar 40b. The first bar 40a is attached to the end of the second bar member 28b while the second bar 40b is attached to the subsequent supporting bar member (28a). A pivot union 38 pivotally secures the first bar 40a to the second bar 40b. The ends of the third bar member (28c) is pivotally attached to the second bar member 28b by way of a second swivel holster 40. This swivel holster includes a first bar 40a and a second bar 40b. The first bar 40a is attached to the end of the third bar member 28c while the second bar 40b is attached to the subsequent supporting bar member 28b. A pivot union 38 pivotally secures the first bar to the second bar of the second swivel holster. This design provides for only one support bar to be pivotally attached to the support plate. When the device is not in use (not covering the vehicle) the supporting bars will be communicating with one another. The pivot union 38 used for securing the supporting bar member to the support plate is discussed and illustrated in further detail in FIG. 4a–4c. The pivot union used for securing the subsequent supporting bar member to the succeeding supporting bar member can be a rivet, bolt, or the like. When the uppermost supporting bar member 28c is lifted, then the succeeding members will inherently lift. The successive lifting of the support members is accomplished due to the fabric cover being secured to each support member. The support plate 36 is a portion of the clamp means. The clamp means is illustrated in further detail in FIGS. 4a–4c.

The clamp means or clamping device of the present invention is located above each wheel member of a vehicle. A sample of the clamping device is illustrated in further detail in FIGS. 4a–4c.

It is noted that these figures illustrate only one clamping device and that the other clamping devices are not separately illustrated in detail in that they are all identical in design.

As illustrated, the clamping device is attached to the side wall 30 of a vehicle. This clamping device consists of a front portion 52 and a back portion 54.

The back portion 54 of the clamping device extends from the inner side wall of the vehicle to the outer side wall of the vehicle. The inner side wall faces the motor of the vehicle while the outer side wall faces away from the vehicle. The inner side wall of conventional vehicles are constructed and designed to have a hook like feature 56 along it entire length.

The back portion or hanger 54 of the clamping device is constructed to have an inverted J-shape when attached to the vehicle. The curved portion 58 of the J-shape hanger 54 is inserted into the hook like feature 56 of a conventional motor vehicle. This permits for the back portion 54 to "hang" from the hook end 56 of the vehicle. Extending downwardly and perpendicularly from the straight edge 60 of the back portion is a flange 62. Centrally located on the flange is an aperture.

The front portion 52 includes the support plate 36. This support plate 36 is a U-shape holster that houses the ends of the bar members 28. Extending across the parallel sides 64a, 64b of the U-shape holster is a shaft 66. This figure illustrates the second embodiment for the hinged member that was discussed and shown in detail in FIG. 3b. As seen in this figure the shaft extends though the a swivel holster 40 that is attached to the end of the supporting bar member 28. The configuration will permit for the bar member or bar members to rotate freely about the shaft. Spacers 68 are used to maintain the ends of the holster from traveling horizontally across the shaft 66. These spacers 68 will limit the horizontal movement along the shaft but the spacers will not interfere with the pivotal movement of the end. As stated previously, these figures illustrate the hinged portion that is illustrated in FIG. 3b.

If the hinged portion that is illustrated in FIG. 3a were to be utilized then additional shafts would be located within the U-shape housing to accept each end of the supporting bar member or holster. A side view for the location of the shafts is illustrated in FIG. 3a. The side view illustrates the attachment point of the shaft to the support plate to be made at pivot union 38. As seen the shafts are arranged such that the proceeding shaft would be at an obtuse angle from its successor shaft. The attachment of the supporting bar member to the shaft is similar as discussed above.

It is noted however, that a swivel holster 40 is not needed and that the end(s) of the supporting bar member(s) can include a through hole for accepting the shaft. This arrangement will eliminate the need of spacers.

A CAM or locking mechanism is attached to the U-shape holster 36. This locking mechanism includes a handle 70 that is attached to a bracket 72. It is noted that the number of brackets used is dependent to the width of the handle. As illustrated in this figure and embodiment, due to the width of the handle illustrated, two brackets are used. The bracket includes a first end 74, a second end 76, and a middle portion 78. The first end 74 is pivotally attached to the handle 70 of the locking mechanism. The middle portion 78 extends through the U-shape support plate via the parallel walls 64a, 64b. The second end extends into the aperture of the flange 62. This flange located on the second end is used to maintain the second end of the bracket to the back portion. As illustrated, the locking mechanism is in an opened position (not secured to the side wall 30 of the vehicle). In order to secure the clamp device to the vehicle handle 70 is lifted upward to permit the distance between the attachment point of the bracket to the U-shape holster to increase (illustrated in outline) inherently causing for the U-shape holster to be in contact with the side wall. This contact will provide for a secured fit on the clamp. To protect the side wall of the vehicle, a cushion 80 is attached to the parallel side wall 64b that is closest to the vehicle.

Though not separately illustrated, the shaft 66 can be attached to the shaft of a reverse drive motor. In this arrangement the ends of the supporting bar member(s) or holster(s) would be securely fastened on the shaft 66. The need for spacers would be eliminated and the ends would not be able to rotate freely about the shaft. This arrangement would permit for a user to activate the motor to rotate the shaft in one direction for opening the device or to activate the motor to close the device. The activation of opening and closing would cause the shaft of the motor to rotate in a desired direction, inherently causing the frame to move upward (open) or downward (close).

Additionally, though not separately illustrated, the ends of supporting bar member(s) or ends of the holster(s) can also be secured to one of the parallel sides of the U-shape plate. This arrangement would permit for a rivet to be used for the attachment and would also eliminate the need of spacers.

Each supporting bar member can be altered in sized. A partial detail view of the supporting bar member is illustrated in further detail in FIGS. 5a and 5b. As seen in these views, the support member includes an inverted U-shape. Each supporting bar member includes a first elongated shaft 82 that is parallel to a second elongated shaft 84 and a third elongated shaft 86 that is perpendicular to the first and second elongated bar. The first and second elongated shafts provide the appropriate height for the vehicle cover apparatus (see FIG. 5b). Due to the various models of cars and vans, this height can be altered by a height adjusting means.

The third shaft provide the appropriate width for the vehicle cover apparatus. Due to the various models of cars and vans, this width can be altered by a width adjusting means. This width adjusting means is identical the height adjusting means.

An example of the height adjusting or width adjusting means is illustrated in these figures. As seen in figures, each shaft includes a first bar 88 that is received in a second bar 90. The first bar 88 can slide freely and linearly within the second bar 90. A spring 92 is attached by an attachment means 102 to the first bar and is maintained within the second bar by the bar's partial enclosed end 94 (it is noted that this end can be completely enclosed if desired). The first bar moves linearly when a force is applied. This force causes the spring to compress in a bias status as well as provides for the supporting bar member to be at its shortest height or thinness width. The attachment means includes an outward spring loaded extension (not illustrated) that is received in an opening (not illustrated) of the second bar. This opening is used to maintain the maintain the button and provide for a compress state of the spring. When the spring loaded extension is removed from the opening, then pressure is relieved which causes the status of the spring 92 to be reversed. That is, the spring 92 returns to an extended status. In this position, the height of the supporting bar member is at its highest extension or the width of the supporting bar member is at its widest extension.

Figure 6A:
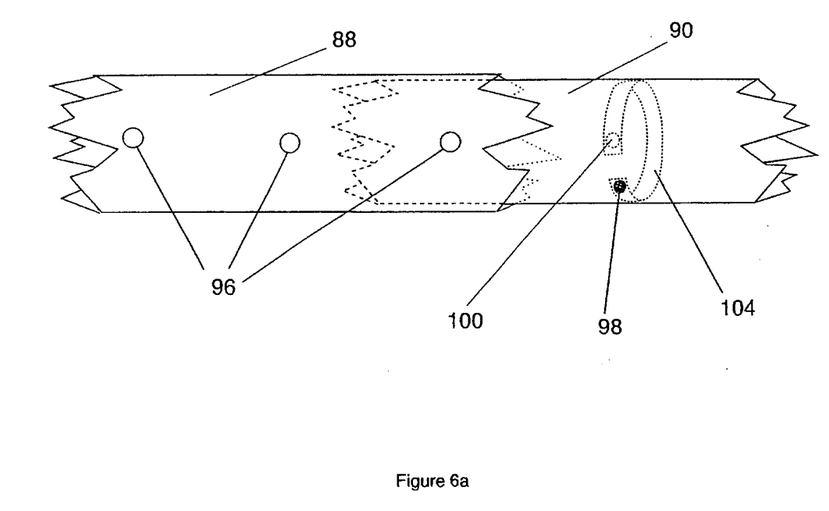
FIGS. 6a and 6b illustrate another embodiment of the extension means of the supporting bars used in the vehicle cover apparatus of the present invention.
Figure 6B:
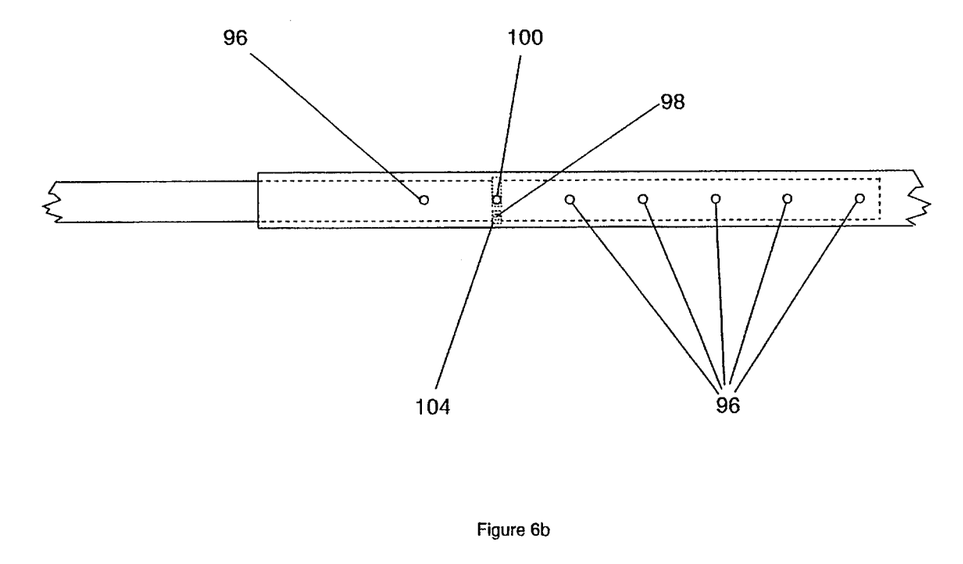

A second example of the height or width adjusting means is illustrated in FIGS. 6a and 6b. As illustrated a first bar 90 is received in the second bar 88. The first bar can move freely within the second bar. Located on the encompassing side wall of the second bar are a plurality of evenly space holes 96. Internally located in the first bar 82 is ring type spring 104 having a first end and a second end. Attached to the first end is a grommet attachment 100. Attached to the second end and extending to the outer surface of the first bar is a spring loaded button 98. In order to adjust the height or width of the supporting bar members, the button 98 is pressed and the first bar slides freely over the second bar. The button emerges at the first available hole located on the second bar, thus locking the supporting bar in a fixed position. If that height or width is not desired then the process is continued until the desired height or width is obtain.

It is noted that the above-described embodiment can be altered and simplified. In order to do so, the ring type spring and grommet are eliminated. This will provide for the first bar member to have a spring loaded button located on its outer surface. The embodiment would operate in the same fashion as described above.

It has been discovered that the number of supporting bar members that is used in each end must be at least three. This arrangement will permit for at least one supporting bar member to be located within the housing while the other bars are used to surround the vehicle when the device is in use.

In order to use the device from a store status, an individual merely opens the closure means on the first and second housing. The front end is remove to extend the first frame over the vehicle and the back end is removed to extend the second frame over the vehicle. The front end and back end are affixed together by a securing means.

It is also noted that the fabric cover of the front or back end of the vehicle cover apparatus can extend pass the frame. As illustrated in FIG. 1a the fabric on the front end extends outwardly to the frame of the second end. However, the fabric cover can be design of any length for each end. For example the fabric cover can extend equally from the front and back end so that once the device is opened (covering the vehicle) the securing means will be centrally located above the roof of the vehicle.

While the invention has been particularly shown and described with reference to an embodiment thereof, it will be understood by those skilled in the art that various changes in form and detail may be made without departing from the spirit and scope of the invention.

I claim:

1. A collapsible canopy style vehicle cover apparatus comprising:

a front end including a first frame and a back end including a second frame;

said front end includes a first housing that is secured to a front bumper of a vehicle, said first housing stores said front end of said vehicle cover apparatus when not in use;

said back end includes a second housing that is secured to a back bumper of said vehicle, said second housing stores said back end of said vehicle cover apparatus when not in use;

said first frame includes a first set of supporting bar members;

each of said supporting bar members of said first set has an inverted U-shape and includes a first end and a second end;

each of said first end is pivotally attached to a first clamp device;

said first clamp device is located in the proximity of a front wheel of said vehicle and is adapted to be removably secured to a first side wall of said vehicle;

each of said second end is pivotally attached to a second clamp device;

said second clamp device is located opposite said first clamp device in the proximity of a second front wheel of said vehicle and is adapted to be removably secured to a second side wall of said vehicle;

said second frame includes a second set of supporting bar members;

each of said supporting bar members of said second set has an inverted U-shape and includes a first end and a second end;

each of said first end of said supporting bar members of said second set is pivotally attached to a third clamp device;

said third clamp device is located in the proximity of a back wheel of said vehicle and is adapted to be removably secured to said first side wall of said vehicle;

each of said second end of said supporting bar members of said second set is pivotally attached to a fourth clamp device;

said fourth clamp device is located opposite said third clamp device in the proximity of a second back wheel of said vehicle and is adapted to be removably secured to said second side wall of said vehicle;

a first fabric cover is secured to said first frame;

said first fabric cover includes a first end and a second end;

said first end of said first cover is secured to said first housing and said second end includes a first closure means;

a second fabric cover is secured to said second frame, and said second fabric cover includes a first end and a second end; and said first end of said second fabric cover is secured to said second housing and said second end includes a second closure means for enabling said first closure means to engage with said second closure means when said vehicle cover apparatus is in a closed position and is covering and protecting said vehicle.

2. A vehicle cover apparatus as in claim 1 wherein said first set of supporting bar members and said second set of supporting bar members can be adjusted in height and width by an adjusting means.

3. A vehicle cover apparatus as in claim 2 wherein said adjusting means further includes each supporting bar member of said first set and said second set to include a first shaft parallel to a second shaft and a third shaft perpendicular to said first shaft and said second shaft to provide for said inverted U-shape; and said first shaft, said second shaft, and said third shaft each include a first bar that is received in a second bar to provide for said first bar to slide freely and linearly within said second bar;

a spring is attached by an attachment means to said first bar and is maintained within said second bar by a partially enclosed end;

said attachment means further includes a spring loaded outward extension and said second bar further includes an opening for receiving said spring loaded outward extension for providing for said spring to be in a compressed state and said spring is extended when said opening is free of said spring loaded outward extension.

4. A vehicle cover apparatus as in claim 2 wherein said adjusting means further includes each supporting bar member of said first set and said second set to include a first shaft parallel to a second shaft and a third shaft perpendicular to said first shaft and said second shaft to provide for said inverted U-shape;

said first shaft, said second shaft, and said third shaft each include a first bar that is received in a second bar to provide for said first bar to slide freely and linearly within said second bar;

said second bar includes a plurality of evenly and linearly spaced holes; and exteriorly attached to said first bar is a spring loaded button for permitting said first bar to slide freely within said second bar and for said spring loaded button to emerge from an opening from said plurality of holes in order to obtain a desired height or width.

5. A vehicle cover apparatus as in claim 1 wherein said first housing and said second housing each includes a first side, a second side, a top portion, a loop of material, and a bottom portion, said bottom portion of said first housing is attached to said front bumper and said bottom portion of said second housing is attached to said back bumper, said loop of material includes an opening that extends linearly within and across said top portion and between said first side and said second side for receiving, maintaining and supporting a first supporting bar member of said first frame and said second frame, said first side and said second side each include a first edge and a second edge, said first edge of said first side is secured to said first edge of said second side, said second edge of said first side and said second edge of said second side each includes a closure means for permitting said first side and said second side to wrap around said first set of supporting bar members or said second set of supporting bar members for enabling said closure means on said first side and said closure means on said second side to contact and engage and to secure said first frame within said first housing and said second frame within said second housing.

6. A vehicle cover apparatus as in claim 1 wherein said first clamping device, said second clamping device, said third clamping device, and said fourth clamping device are identical and each include a hanger that is attached interiorly to said first side wall and said second side wall of said vehicle, said clamping device further includes a U-shape holster that houses and maintains said ends of said supporting bar members, said ends of said supporting bar members are pivotally attached to said U-shape holster, a flange that includes an aperture extends perpendicularly and downwardly from said hanger, a locking mechanism is attached to said U-shape holster, said locking mechanism includes a handle that is attached to a bracket at an attachment point, said bracket includes a first end, a second end and a middle portion, said first end is pivotally attached to said handle and said middle portion extends through said U-shape holster and said second end extends into said aperture of said flange, said second end includes a second flange that extends from said bracket and is used to maintain said second end of said bracket to said hanger, and said locking mechanism secures said clamp device to said vehicle by lifting said handle upwardly causing a distance between said attachment point to increase and causing for said U-shape holster to be in contact with said vehicle.

7. A vehicle cover apparatus as in claim 6 wherein a cushion is attached to said U-shape holster for providing for said cushion to contact said vehicle when said clamping device is secured to said vehicle.

8. A collapsible canopy style vehicle cover apparatus comprising:

a front end including a first frame and a back end including a second frame;

said front end includes a first housing that is secured to a front bumper of a vehicle, said first housing stores said front end of said vehicle cover apparatus when not in use;

said back end includes a second housing that is secured to a back bumper of said vehicle, said second housing stores said back end of said vehicle cover apparatus when not in use;

said first frame includes a first set of supporting bar members;

each of said supporting bar members of said first set has an inverted U-shape and includes a first end and a second end;

said first end of a first supporting bar member of said first set is pivotally attached to a first clamp device and each succeeding supporting bar member is pivotally secured to a subsequent supporting bar member;

said first clamp device is located in the proximity of a front wheel of said vehicle and is adapted to be removably secured to a first side wall of said vehicle;

said second end of said first supporting bar member of said first set is pivotally attached to a second clamp device and said second and of each succeeding supporting bar is pivotally secured to said subsequent supporting bar member;

said second clamp device is located opposite said first clamp device in the proximity of a second front wheel of said vehicle and is adapted to be removably secured to a second side wall of said vehicle;

said second frame includes a second set of supporting bar members;

each of said supporting bar members of said second set has an inverted U-shape and includes a first end and a second end;

said first end of a first supporting bar member of said second set is pivotally attached to a third clamp device and said first end of each succeeding supporting bar member is pivotally secured to a subsequent supporting bar member of said second set;

said third clamp device is located in the proximity of a back wheel of said vehicle and is adapted to be removably secured to said first side wall of said vehicle;

said second end of a first supporting bar of said second set is pivotally attached to a fourth clamp device and said second end of each succeeding supporting bar is pivotally secured to said subsequent supporting bar member of said second set;

said fourth clamp device is located opposite said third clamp device in the proximity of a second back wheel of said vehicle and is adapted to be removably secured to said second side wall of said vehicle;

a first fabric cover is secured to said first frame and a second fabric cover is secured to said second frame for providing said first fabric cover to be secured to each supporting bar member of said first frame and for said second fabric cover to be secured to each supporting bar member of said second frame;

said first fabric cover includes a first end and a second end;

said first end of said first cover is secured to said first housing and said second end includes a first closure means;

said second fabric cover includes a first end and a second end; and said first end of said second fabric cover is secured to said second housing and said second end includes a second closure means for enabling said first closure means to engage with said second closure means when said vehicle cover apparatus is in a closed position and is covering and protecting said vehicle.

9. A vehicle cover apparatus as in claim 8 wherein said first set of supporting bar members and said second set of supporting bar members can be adjusted in height and width by an adjusting means.

10. A vehicle cover apparatus as in claim 9 wherein said adjusting means further includes each supporting bar member of said first set and said second set to include a first shaft parallel to a second shaft and a third shaft perpendicular to said first shaft and said second shaft to provide for said inverted U-shape;

said first shaft, said second shaft, and said third shaft each include a first bar that is received in a second bar to provide for said first bar to slide freely and linearly within said second bar;

a spring is attached by an attachment means to said first bar and is maintained within said second bar by a partially enclosed end; and said attachment means further includes a spring loaded outward extension and said second bar further includes an opening for receiving said spring loaded outward extension for providing for said spring to be in a compressed state and said spring is extended when said opening is free of said spring loaded outward extension.

11. A vehicle cover apparatus as in claim 9 wherein said adjusting means further includes each supporting bar member of said first set and said second set to include a first shaft parallel to a second shaft and a third shaft perpendicular to said first shaft and said second shaft to provide for said inverted U-shape;

said first shaft, said second shaft, and said third shaft each include a first bar that is received in a second bar to provide for said first bar to slide freely and linearly within said second bar;

said second bar includes a plurality of evenly and linearly spaced holes; and exteriorly attached to said first bar is a spring loaded button for permitting said first bar to slide freely within said second bar and for said spring loaded button to emerge from an opening from said plurality of holes in order to obtain a desired height or width.

12. A vehicle cover apparatus as in claim 8 wherein said first housing and said second housing each includes a first side, a second side, a top portion, a loop of material, and a bottom portion, said bottom portion of said first housing is attached to said front bumper and said bottom portion of said second housing is attached to said back bumper, said loop of material includes an opening that extends linearly within and across said top portion and between said first side and said second side is for receiving, maintaining and supporting a first supporting bar member of said first frame and said second frame, said first side and said second side each include a first edge and a second edge, said first edge of said first side is secured to said first edge of said second side, said second edge of said first side and said second edge of said second side each includes a closure means for permitting said first side and said second side to wrap around said first set of supporting bar members or said second set of supporting bar members for enabling said closure means on said first side and said closure means on said second side to contact and engage and to secure said first frame within said first housing and said second frame within said second housing.

13. A vehicle cover apparatus as in claim 8 wherein said first clamping device, said second clamping device, said third clamping device, and said fourth clamping device are identical and each include a hanger that is attached interiorly to said first side wall and said second side wall of said vehicle, said clamping device further includes a U-shape holster that houses and maintains said ends of said supporting bar members, said ends of said supporting bar members are pivotally attached to said U-shape holster, a flange that includes an aperture extends perpendicularly and downwardly from said hanger, a locking mechanism is attached to said U-shape holster, said locking mechanism includes a handle that is attached to a bracket at an attachment point, said bracket includes a first end, a second end and a middle portion, said first end is pivotally attached to said handle and said middle portion extends through said U-shape holster and said second end extends into said aperture of said flange, said second end includes a second flange that extends from said bracket and is use to maintain said second end of said bracket to said hanger, and said locking mechanism secures said clamp device to said vehicle by lifting said handle upwardly causing a distance between said attachment point to increase and causing for said U-shape holster to be in contact with said vehicle.

14. A vehicle cover apparatus as in claim 13 wherein a cushion is attached to said U-shape holster for providing for said cushion to contact said vehicle when said clamping device is secure to said vehicle.

15. A vehicle cover apparatus as in claim 1 wherein said first frame includes at least three supporting bar members in said first set and said second frame includes at least three supporting bar members in said second set.

16. A vehicle cover apparatus as in claim 8 wherein said first frame includes at least three supporting bar members in said first set and said second frame includes at least three supporting bar members in said second set.

17. A collapsible canopy style vehicle cover apparatus comprising:

a front end and a back end;
said front end includes a first frame that is stored in a first housing when not in use, and said back end includes a second frame that is stored in a second housing when not in use;
said first housing is secured to a front bumper of a vehicle and said second housing is secured to a back bumper of said vehicle;
said first frame includes a first set of inverted U-shaped supporting bar members having ends pivotally attached to a first clamp device and a second clamp device, and said first clamp device and said second clamp device are oppositely located and are secured in proximity to the front wheels of said vehicle;
said second frame includes a second set of inverted U-shaped supporting bar members having ends pivotally attached to a third clamp device and a fourth clamp device and said third clamp device and said fourth clamp device are oppositely located and are secured in proximity to the rear wheels of said vehicle; and
a first fabric cover is secured to each inverted U-shaped support bar member of said first set of inverted U-shaped supporting bar members and a second fabric cover is secured to each inverted U-shape support bar member of said second set of inverted U-shaped supporting bar members.

18. A collapsible canopy style vehicle cover apparatus as in claim 17 wherein said first set of supporting bar members and said second set of supporting bar members can be adjusted in height or width, or both height and width by an adjusting means.

19. A collapsible canopy style vehicle cover apparatus as in claim 18 wherein said first frame includes at least three supporting bar members in said first set and said second frame includes at least three supporting bar members in said second set.

20. A collapsible canopy style vehicle cover apparatus as in claim 18 wherein said first fabric cover includes a first end and a second end, said second end of said first fabric cover is secured to said first housing and said second end includes a first closure means, said second fabric cover includes a first end and a second end, and said first end of said second fabric cover is secured to said second housing and said second end includes a second closure means to enable said first closure means to engage with said second closure means when said vehicle cover apparatus is in a closed position and is covering and protecting said vehicle.

* * * * *